United States Patent [19]

Zirps

[11] 4,067,360
[45] Jan. 10, 1978

[54] VALVE FOR CONTROLLING AN OPENING FOR THE PASSAGE OF FLUID INTO AND OUT OF A PRESSURE ACCUMULATOR

[75] Inventor: Wilhelm Zirps, Hemmingen, Germany

[73] Assignee: Robert Bosch GmbH, Stuttgart, Germany

[21] Appl. No.: 699,861

[22] Filed: June 25, 1976

[30] Foreign Application Priority Data

Aug. 16, 1975 Germany .............................. 2536484

[51] Int. Cl.² ........................................... F16L 55/04
[52] U.S. Cl. ....................................... 138/30; 138/31
[58] Field of Search ............................ 138/30, 31, 92; 251/282

[56] References Cited

U.S. PATENT DOCUMENTS

| 2,331,921 | 10/1943 | Mercier | 138/30 |
| 2,385,016 | 9/1945 | Mercier | 138/30 |
| 3,580,290 | 5/1971 | Sugimura | 138/30 |

FOREIGN PATENT DOCUMENTS 1,078,564  11/1954  France .................................. 138/30

Primary Examiner—Richard E. Aegerter
Assistant Examiner—W. Little
Attorney, Agent, or Firm—Michael J. Striker

[57] ABSTRACT

A valve for controlling an opening for the passage of fluid into and out of a pressure accumulator has a valve member, which, by the elastically expanding membrane of the pressure accumulator, can be brought against the force of a spring to a closed position. An orifice plate located in the valve housing creates a pressure difference to opposite sides of the plate, and this pressure difference is directed to opposite sides of a piston operably connected to the valve member to thereby bias the latter to the open position during outflow of fluid from the pressure accumulator, to thus prevent a premature movement of the valve member to the closed position.

8 Claims, 1 Drawing Figure

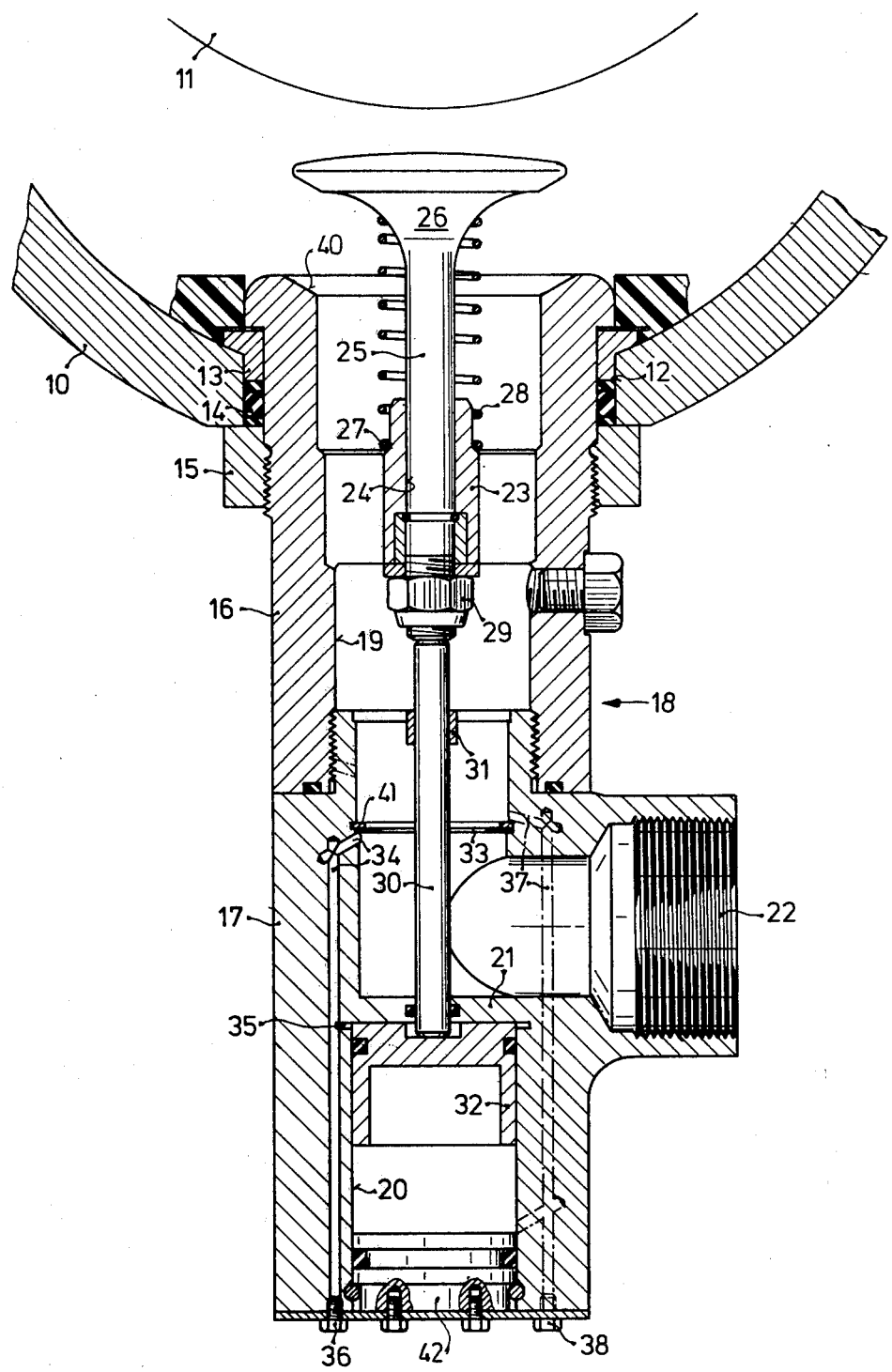

VALVE FOR CONTROLLING AN OPENING FOR THE PASSAGE OF FLUID INTO AND OUT OF A PRESSURE ACCUMULATOR

BACKGROUND OF THE INVENTION

The present invention relates to a valve for controlling an opening for the passage of fluid into and out of a pressure accumulator. A valve member, which by the elastically expanding membrane of the pressure accumulator can be brought against the force of a spring to the closed position, is connected to a piston acted upon by part of the fluid passing through the valve housing, tending thereby to move the valve member to the open position.

In a known valve of this type, the valve member has at one end a plate-shaped portion adapted to cooperate with the valve seat and a stem portion projecting therefrom which is provided with a longitudinal bore leading to a space defined at one end by a piston fixedly connected to the valve stem. Below the plate-shaped portion of the valve member there are provided radial bores which communicate with the bore extending through the valve stem.

In valves of the aforementioned kind the problem exists that, when fluid passes at high speed out of the pressure accumulator, the valve will be prematurely closed due to the underpressure forming in the valve gap. Provision of a stronger spring biasing the valve to the open position is for various reasons not suitable.

In this known valve fluid will pass through the radial bores and the longitudinal bore into the space defined at one end by the piston, to thus form a counter force which is supposed to prevent a premature closing of the valve. It has however been established that this arrangement does not operate in a stable and secure manner due to the flow condition of the liquid below the valve seat.

SUMMARY OF THE INVENTION

It is an object of the present invention to provide a valve of the aforementioned type which securely prevents a premature closing of the valve and which will operate in a stable manner.

With these and other objects in view, which will become apparent as the description proceeds, the valve according to the present invention for controlling an opening for passage of fluid into and out of a pressure accumulator having an elastic diaphragm opposite said opening, mainly comprises an elongated valve housing having an inner end provided with a valve seat and extending in a sealed manner through an opening to the outside of the pressure accumulator, fluid passage means communicating with the interior of the valve housing spaced from the inner end, a valve member movable between a closed position engaging the valve seat and an open position, biasing means biasing the valve member to the open position, a piston slidably guided in the valve housing, a push rod abutting with opposite ends respectively against the piston and the valve member, an orifice plate arranged in the valve housing between the inner end and the fluid passage means and creating during flow of fluid through the valve housing a pressure difference in the latter to opposite sides of the orifice plate, and channel means in the valve housing transmitting such pressure difference to opposite sides of the piston so that the latter acts through the push rod on the valve member tending to maintain the latter in the open position during outflow of fluid from the pressure accumulator and expanding of the elastic membrane of the pressure accumulator toward the valve member.

The valve according to the present invention has, as compared to the known valve of the above-mentioned kind, the essential advantage that the control pressure for the piston is constituted by the pressure difference to opposite sides of the orifice plate, whereby movement of the valve can be controlled in an exact manner in dependence on the amount of flow of fluid passing through the valve. This will facilitate the adaptation of the control pressure to the force created by the fluid flow through the valve and acting in a closing direction on the valve member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing illustrates a longitudinal cross section through the valve and part of the pressure accumulator to which the valve is connected.

DESCRIPTION OF THE PREFERRED EMBODIMENT

The pressure accumulator to which the valve according to the present invention is connected comprises a steel housing 10, of which only the lower part is shown in the drawing, through which an elastic membrane 11 extends in a known manner, which, depending on the pressure conditions in the accumulator, is more or less elastically expanded.

The pressure accumulator is provided at its lower end with an opening 12 in which, by means of a holding ring 13, an annular seal 14 and a nut 15, an elongated valve housing 18 comprising two tubular parts 16 and 17 is fastened in a fluid-tight manner. The coaxial bores 19 and 20 of the valve housing 18 are separated by a transverse wall 21 integral with the housing part 17. A fluid passage 22 is formed in an upper portion of the housing part 17, communicating with the bore 19 and arranged at right angles to the axis of the latter.

A tubular guide 23 is arranged in the upper portion of the housing part 16, connected thereto by ribs not shown in the drawing, and this guide member 23 has a longitudinal bore 24 in which the stem 25 of the plate-shaped valve member 26 is guided for movement in longitudinal direction of the elongated valve housing between a closed position engaging the valve seat 40, provided at the inner end of the valve housing, and an open position. The diameter of the guide member 23 is considerably smaller than the diameter of the bore 19. A coil compression spring 28 wound about the valve stem 24 abuts with opposite ends against a shoulder 27 on the guide member 23 and on the plate-shaped portion of the valve member to thus bias the latter to the open position. A nut 29, screwed onto the threaded lower end of the valve stem 25, limits the opening stroke of the valve member.

A push rod 30 is arranged in the valve housing 18, coaxial with the valve stem 24, and the push rod 30 is guided at its lower end in a fluid-tight manner in a bore in the transverse wall 21 and at an upper portion thereof in a guide member 31 connected to the upper end of the housing part 17. The push rod 30 abuts with its upper end against the lower end of the valve stem 25 and with its lower end onto a piston 32 which is closely guided in the bore 20. The piston 32 is pot-shaped and the push rod 30 abuts with its lower end onto the upper transverse wall of the piston 32.

An orifice plate 33 is arranged in the bore 19 of the housing part 17 above the place where the passage 22 communicates with the bore. An outer peripheral portion of orifice plate 33 abuts with one face thereof against a shoulder formed in housing part 17 and a snap ring 41 engages the other face of the orifice plate 33 to removably hold the latter against the aforementioned shoulder. A first channel 34 formed in the wall of the housing part 17 leads from a location below the orifice plate 33 and closely adjacent thereto to an annular groove 35 located at the upper end of the bore 20. The lower end of the first channel 34 is closed by a screw 36. A second channel 37 leads from a location directly above the orifice plate 33 to the lower part of the bore 20 and communicates with the latter above closure means 42, fluid-tightly closing the lower end of the bore 20. The channel 37 is, since it is located in another plane than the plane at which the cross-section is taken in the drawing, shown in dash dotted lines, and closed at its lower end by a screw 38. When the piston 32 is in its uppermost position, as shown in the drawing, and the valve member 26 is in fully open position, the push rod 30 extends between the upper surface of the piston 32 and the lower end of the stem 25 of the valve member.

The above described valve arrangement will operate as follows:

When fluid flows through the fluid passage 22 and the bore 19 into the housing 10 of the pressure accumulator, then the valve is in its fully open position, as shown in the drawing. During such fluid flow a higher pressure will be maintained below the orifice plate 33 and this higher pressure will act through the channel 34 onto the upper face of the piston 32, whereas the lower pressure, above the orifice plate 33, will be transmitted through the channel 37 to the lower side of the piston 32. The piston 32 will therefore move in downward direction and the upper end of the push rod 30 will become disassociated from the lower end of the stem 25 of the valve member. The coil compression spring 38 and the pressure of the fluid flowing into the housing 10 of the pressure accumulator will hold the valve member 26 in the fully open position.

When fluid is taken out from the pressure accumulator, then the pressure conditions at the orifice plate 33 are reversed. The higher pressure residing now above the orifice plate 33 is now transmitted through the channel 37 to the underside of the piston 32, whereas the lower pressure is transmitted through the channel 34 to the upper side of the piston. The piston 32 moves thereby upwardly and holds through the push rod 30 the valve in open position. If this would not be the case, then the valve member could close prematurely, since due to the high speed of the outflowing fluid a lower pressure will be created on the bottom face of the plate shaped portion of the valve member than on the upper face thereof. Due to the pressure difference formed at the orifice plate, the valve member remains in its open position until most of the fluid below the membrane 11 is discharged from the pressure accumulator at which time the expanded membrane presses the valve member 26 on to the seat 40.

By means of a corresponding selection of the inner diameter of the orifice plate, the force acting on the valve member in closing direction, due to the stream of the outflowing fluid, can be fully or partly compensated. Since the orifice plate 33 is, by means of the snap ring 41, removably mounted in the valve housing 18 can be easily replaced by orifice plates having respectively orifices of different size to thereby compensate the aforementioned valve closing force in any desired manner. The control pressure can thus easily be adapted to any valve closing force created by the outflowing fluid stream. Due to the exact correlation of the pressures the valve will operate in a very stable manner.

It will be understood that each of the elements described above, or two or more together, may also find a useful application in other types of valves for controlling an opening for the passage of fluid into and out of a pressure accumulator, differing from the types described above.

While the invention has been illustrated and described as embodied in a valve for controlling the opening for the passage of fluid into and out of a pressure accumulator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generoc or specific aspects of this invention.

What is claimed as new and desired to be protected by Letters Patent is set forth in the appended claims:

1. In combination with a pressure accumulator having an opening for the passage of fluid into and out of the same and an elastic membrane opposite said opening, a valve for controlling said opening, said valve comprising an elongated valve housing having an inner end provided with a valve seat and extending in a sealed manner through said opening to the outside of said pressure accumulator; fluid passage means communicating with the interior of the valve housing spaced from said inner end; a valve member movable between a closed position engaging said valve seat and an open position; biasing means biasing said valve member to said open position; a piston slidably guided in said valve housing; a push rod abutting with opposite ends respectively against said piston and said valve member; an orifice plate arranged in said valve housing between said inner end and said fluid passage means and creating during flow of fluid through said valve housing a pressure difference in the latter to opposite sides of said orifice plate; and channel means in said valve housing for transmitting such pressure difference to opposite sides of said piston so that the latter acts through said push rod on said valve member tending to maintain the latter in said open position during outflow of fluid from said pressure accumulator and expanding of the elastic membrane of said pressure accumulator towards said valve member.

2. A valve as defined in claim 1, wherein said housing comprises a transverse wall between said inner end and the opposite end of said housing and dividing the interior of said housing in a first portion between said inner end and said transverse wall and a second portion between said transverse wall and said opposite end of said housing, said passage means communicating with the interior of said first housing portion, said piston being movable in the interior of said second housing portion, closure means closing said second housing portion at said opposite end of said housing, said channel means comprising a first channel communicating at one end with the interior of said first housing portion adjacent said orifice plate and on the side thereof facing the transverse wall and at the other end with the interior of said second housing portion adjacent said transverse wall, and a second channel communicating at one end thereof with the interior of said first housing portion adjacent said orifice plate and on the side thereof facing away from said transverse wall and at the other end thereof with the interior of said second housing portion adjacent said closure means.

3. A valve as defined in claim 2, wherein said piston rod is closely guided for movement in axial direction in an opening in said transverse wall and further guide means for said piston rod arranged in said first housing portion between said transverse wall and said valve member.

4. A valve as defined in claim 1, wherein said valve member, said push rod and said piston are arranged along a common axis, and wherein said fluid passage means extend substantially normal to said axis.

5. A valve as defined in claim 1, and including means for removably mounting said orifice plate in said valve housing so that the orifice plate may be exchanged against orifice plates having respectively orifices of different size.

6. A valve as defined in claim 1, and including means in said valve housing for guiding said valve member movable in the longitudinal direction of said valve housing.

7. A valve as defined in claim 6, wherein said valve member has at one end a plate-shaped portion adapted to cooperate with said valve seat and a stem portion projecting therefrom into said valve housing, said stem portion being guided in said guide means for said valve member, and including stop means at the other end of said valve member adapted to engage said guide means thereof for limiting the movement of said plate-shaped portion away from said valve seat.

8. A valve as defined in claim 7, wherein said biasing means comprises a coil compression spring wound about said valve stem and abutting with opposite ends against said plate-shaped portion and said guide means of said valve member, respectively.

* * * * *